US008075640B2

(12) United States Patent
Marek et al.

(10) Patent No.: US 8,075,640 B2
(45) Date of Patent: Dec. 13, 2011

(54) DICED ELECTROLYTIC CAPACITOR ASSEMBLY AND METHOD OF PRODUCTION YIELDING IMPROVED VOLUMETRIC EFFICIENCY

(75) Inventors: Ladislav Marek, Lanskroun (CZ); Stanislav Zednicek, Lanskroun (CZ); Jaroslav Tomasko, Lanskroun (CZ); Jiri Navratil, Veseli nad Moravou (CZ)

(73) Assignee: AVX Corporation, Myrtle Beach, SC (US)

( * ) Notice: Subject to any disclaimer, the term of this patent is extended or adjusted under 35 U.S.C. 154(b) by 442 days.

(21) Appl. No.: 12/357,711

(22) Filed: Jan. 22, 2009

(65) Prior Publication Data

US 2010/0182735 A1 Jul. 22, 2010

(51) Int. Cl.
*H01G 9/00* (2006.01)
(52) U.S. Cl. .................................................. 29/25.03
(58) Field of Classification Search .................. 29/25.03
See application file for complete search history.

(56) References Cited

U.S. PATENT DOCUMENTS

| | | | |
|---|---|---|---|
| 2,936,514 | A | 5/1960 | Millard |
| 3,345,545 | A | 10/1967 | Bourgault et al. |
| 3,588,628 | A | 6/1971 | Beck |
| 3,781,976 | A | 1/1974 | Tomiwa |
| 3,789,274 | A | 1/1974 | Pfister |
| 3,828,227 | A | 8/1974 | Millard et al. |
| 3,997,821 | A | 12/1976 | Sternbeck |
| 4,017,773 | A | 4/1977 | Cheseldine |
| 4,085,435 | A | 4/1978 | Galvagni |
| 4,107,762 | A | 8/1978 | Shirn et al. |
| 4,247,883 | A | 1/1981 | Thompson et al. |
| 4,288,842 | A | 9/1981 | Voyles |
| 4,488,204 | A | 12/1984 | Beck, Jr. |
| 4,497,105 | A | 2/1985 | Uemura |
| 4,571,662 | A | 2/1986 | Conquest et al. |
| 4,675,790 | A | 6/1987 | DeMatos et al. |
| 4,945,452 | A | 7/1990 | Sturmer et al. |
| 4,972,299 | A | 11/1990 | Hagiwara et al. |
| 5,198,968 | A | 3/1993 | Galvagni |
| 5,349,496 | A | 9/1994 | Taniguchi et al. |
| 5,357,399 | A | 10/1994 | Salisbury |

(Continued)

FOREIGN PATENT DOCUMENTS

EP   1061537 A2   12/2000

(Continued)

OTHER PUBLICATIONS

Abstract of Japanese Patent No. JP01-227422, Mar. 7, 1988.

(Continued)

*Primary Examiner* — Alexander Ghyka
*Assistant Examiner* — Seahvosh Nikmanesh
(74) *Attorney, Agent, or Firm* — Dority & Manning, P.A.

(57) ABSTRACT

A surface-mountable electrolytic capacitor with improved volumetric efficiency includes an electrolytic capacitor element, anode and cathode terminations, an encapsulation material and external terminations. The capacitor element has first and second opposing end surfaces and an anode wire extending from the first end surface that is electrically connected to a first anode termination portion. A first cathode termination portion is conductively adhered to a surface of the capacitor element, and a second portion is perpendicular to the first portion and parallel to the second end surface of the capacitor element. Encapsulating material surrounds the capacitor element to form a device package that is subsequently diced to improve volumetric efficiency and optionally expose the anode and cathode terminations on opposing end surfaces. First and second external terminations may be formed over the exposed portions of anode and cathode terminations to wrap around to one or more given surfaces of the device package.

11 Claims, 9 Drawing Sheets

U.S. PATENT DOCUMENTS

| | | | |
|---|---|---|---|
| 5,390,074 A | 2/1995 | Hasegawa et al. |
| 5,394,295 A | 2/1995 | Galvagni et al. |
| 5,461,537 A | 10/1995 | Kobayashi et al. |
| 5,495,386 A | 2/1996 | Kulkarni |
| 5,840,086 A | 11/1998 | Takami et al. |
| 5,949,639 A | 9/1999 | Maeda et al. |
| 6,017,367 A | 1/2000 | Nakata |
| 6,191,936 B1 | 2/2001 | Webber et al. |
| 6,197,252 B1 | 3/2001 | Bishop et al. |
| 6,236,561 B1 | 5/2001 | Ogino et al. |
| 6,262,878 B1 | 7/2001 | Shirashige et al. |
| 6,322,912 B1 | 11/2001 | Fife |
| 6,333,844 B1 | 12/2001 | Nakamura |
| 6,346,127 B1 | 2/2002 | Kuriyama |
| 6,380,577 B1 | 4/2002 | Cadwallader |
| 6,400,556 B1 | 6/2002 | Masuda et al. |
| 6,430,034 B2 | 8/2002 | Sano et al. |
| 6,467,142 B1 | 10/2002 | Shirashige et al. |
| 6,477,030 B2 | 11/2002 | Hidaka et al. |
| 6,519,135 B2 | 2/2003 | Sano et al. |
| 6,616,713 B2 | 9/2003 | Sano et al. |
| 6,625,009 B2 | 9/2003 | Maeda |
| 6,674,635 B1 | 1/2004 | Fife et al. |
| 6,680,841 B2 | 1/2004 | Tadanobu et al. |
| 6,717,793 B2 | 4/2004 | Arai et al. |
| 6,751,086 B2 | 6/2004 | Matsumoto |
| 6,808,541 B2 | 10/2004 | Maeda |
| 6,870,727 B2 | 3/2005 | Edson et al. |
| 6,870,728 B1 | 3/2005 | Burket et al. |
| 6,882,521 B2 | 4/2005 | Tsutsui et al. |
| 6,891,717 B2 | 5/2005 | Fujii et al. |
| 6,903,921 B2 | 6/2005 | Ishijima |
| 6,903,922 B2 | 6/2005 | Sano et al. |
| 6,920,037 B2 | 7/2005 | Sano et al. |
| 6,970,345 B2 | 11/2005 | Oh et al. |
| 6,992,880 B2 | 1/2006 | Tadanobu et al. |
| 6,995,972 B2 | 2/2006 | Fujii et al. |
| 7,027,291 B2 | 4/2006 | Horio et al. |
| 7,057,882 B2 | 6/2006 | Fujii et al. |
| 7,116,548 B2 | 10/2006 | Satterfield, Jr. et al. |
| 7,149,077 B2 | 12/2006 | Ishijima |
| 7,158,368 B2 | 1/2007 | Fujii et al. |
| 7,262,511 B2 | 8/2007 | Osako et al. |
| 7,271,995 B2 | 9/2007 | Edson et al. |
| 7,449,032 B2 | 11/2008 | Vaisman et al. |
| 2003/0104923 A1 | 6/2003 | Omori et al. |
| 2008/0062617 A1 | 3/2008 | Edson et al. |
| 2008/0247122 A1 | 10/2008 | Vaisman et al. |

FOREIGN PATENT DOCUMENTS

| | | |
|---|---|---|
| GB | 2123610 A | 2/1984 |
| JP | 5547449 | 11/1980 |
| JP | 129050 | 6/1989 |
| JP | 01276613 | 7/1989 |
| JP | 5234828 | 9/1993 |
| JP | H7 106204 | 4/1995 |
| JP | H11 87175 | 3/1999 |
| JP | 11288844 | 10/1999 |
| JP | 2009 081345 A | 4/2009 |

OTHER PUBLICATIONS

Abstract of Japanese Patent No. JP02-087612, Sep. 11, 1989.
Abstract of Japanese Patent No. JP06-005478, Jan. 14, 1994.
Abstract of Japanese Patent No. JP08-130166, May 21, 1996.
Abstract of Japanese Patent No. JP2000049048, Feb. 18, 2000.
Abstract of Japanese Patent No. JP2001291641, Oct. 19, 2001.
Abstract of Japanese Patent No. JP2001110676, Apr. 20, 2001.
Abstract of Japanese Patent No. JP7106204, Apr. 21, 1995.
Abstract of Japanese Patent No. JP7240343, Sep. 12, 1995.
Article—*Adsorption of Gases in Multirnolecular Layers*, Brunauer et al., The Journal of the American Chemical Society, vol. 60, Jan.-Jun. 1938, pp. 309-319.
Related U.S. Patent Application Form.
U.S. Appl. No. 12/206,186, filed Sep. 8, 2008, Zednicek et al., Solid Electrolytic Capacitor for Embedding Into a Circuit Board.

DICED ELECTROLYTIC CAPACITOR ASSEMBLY AND METHOD OF PRODUCTION YIELDING IMPROVED VOLUMETRIC EFFICIENCY

BACKGROUND OF THE INVENTION

Electrolytic capacitors are traditionally known for their high capacitance value and compactness. Despite the existing compactness of known electrolytic capacitors and electrolytic capacitor arrays, there are constant efforts to reduce the volume and corresponding volumetric efficiency of such electronic components.

Exemplary components of a conventional electrolytic capacitor include a main capacitor body including respective anode and cathode portions, an anode lead (e.g., an anode wire embedded in the capacitor body), and a cathode lead (e.g., a leadframe connected to the cathode portion) all molded together in an encapsulating resin package. The volumetric efficiency of an electrolytic capacitor is typically defined as the ratio of the main capacitor body volume to the volume of the entire molded capacitor package. The anode and cathode leads of such capacitors form respective positive and negative electrical connections to the capacitor structure. These electrical connections sometimes extend axially from the capacitor structure, and in such cases can take up a significant amount of space inside the capacitor package.

In other electrolytic capacitor configurations, the anode and cathode leads are arranged to accommodate surface mounting of the electrolytic capacitor, which can be especially useful when electrolytic capacitors are employed in any type of integrated circuit environment. Thus, chip-type electrolytic capacitors have been designed not only with volumetric performance characteristics in mind, but also such that device mounting to a substrate is facilitated. Such facilitated device mounting is often achieved by configuring both electrical terminations to extend from a selected surface of the capacitor. Several known examples employ substantially coplanar termination arrangements that facilitate surface mounting of an electrolytic capacitor to a substrate.

While various configurations of surface-mount electrolytic capacitors exist, the anode and cathode leads as well as the resin package of such capacitors may still take up a significant amount of room within the overall capacitor assembly. As such, a need currently exists for a capacitor system and corresponding method of manufacture that provides further improvements in volumetric efficiency, device profile and electrical performance characteristics.

SUMMARY OF THE INVENTION

In accordance with one embodiment of the present invention, a method is provided for forming a solid electrolytic capacitor with a surface mountable configuration and improved volumetric efficiency. The capacitor includes a capacitor element containing an anode formed from a valve metal composition (such as but not limited to a composition including one or more of tantalum and niobium oxide), a dielectric film overlying the anode, and a solid electrolyte (such as but not limited to one containing manganese oxide or a conductive polymer) overlying the dielectric film. The solid electrolyte or other outer surface forms a cathode for the capacitor element. The capacitor element is characterized by first and second opposing end surfaces. An anode lead (e.g., an anode wire) is embedded in the anode and extends from the first end surface of the capacitor element.

A leadframe is provided to form respective anode and cathode terminations for the capacitor. An anode termination is electrically connected to the anode lead and configured such that a first anode termination portion is substantially parallel to the first end surface of the capacitor element. A second anode termination portion may be configured in a substantially perpendicular direction to the first portion. The cathode termination includes at least first and second portions, one or both of which may be in direct electrical connection to the cathode. The first cathode termination portion is parallel to the second end surface of the capacitor element, and is substantially perpendicular to the second cathode termination portion. The second anode termination portion and second cathode termination portions may be provided in substantially the same plane.

The capacitor element is connected to the leadframe at two different locations. First, the anode lead may be connected, for example, by laser welding the lead to a recessed groove formed within the first anode termination portion. The cathode portion of the capacitor element may be connected to the first and/or second cathode termination portions by a conductive adhesive or other suitable securing means. To help prevent undesirable electrical shorting, it may be desirable to isolate the second anode termination portion from the cathode by providing an insulating material.

Encapsulation material (such as a molded resin case) is formed to create a device package. The encapsulation material is formed to substantially surround the capacitor element and portions of the leadframe. Encapsulation may leave the second anode termination portion and second cathode termination portion exposed along a given mounting surface. Alternatively, such second termination portions may be exposed by one or more dicing cuts formed through the encapsulated device body.

Additional dicing steps may also cut through the encapsulated device body at one or more locations, each substantially parallel to a respective surface of the capacitor element, in order to remove excess encapsulating material and improve overall volumetric efficiency. In one embodiment, dicing forms first and second opposing cut surfaces, one of which exposes the first anode termination portion along a first cut end surface and the other of which exposes the first cathode termination portion along a second cut end surface.

External terminations may then be applied over the exposed anode and cathode terminations, including first and/or second anode and cathode termination portions thereof. In one example, a first external termination covers exposed first anode termination portion along a first end surface and wraps over onto the second anode termination portion exposed along a given mounting surface. Similarly, a second external termination covers exposed first cathode termination portion along a second end surface and wraps over onto the second cathode termination portion exposed along the given mounting surface. In another example, each first and second external termination covers the entirety of an end surface and wraps around to each of four adjacent surfaces. Such external termination configurations provide for termination features that allow for surface mounting and circuit attachment at a single device surface.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIGS. 12a-15 are respective views of an exemplary capacitor structure after anode and cathode terminations are trimmed, wherein FIGS. 12a and 12b provide top and bottom perspective views relative to –X, –Y and –Z axes, FIGS. 13a and 13b provide opposing end plan views in the Z-X plane, FIG. 14 provides a side plan view in the Z-Y plane and FIG. 15 provides a bottom (surface mount) plan view in the X-Y plane;

FIGS. 16a-20b are respective views of two exemplary diced capacitors in accordance with the present invention, wherein FIGS. 16a and 16b provide perspective views of diced capacitor ends on the anode side of the two capacitors, FIGS. 17a and 17b provide perspective views of diced capacitor ends on the cathode side of the two capacitors, FIGS. 18a and 18b provide side plan views of the two exemplary diced capacitors, FIGS. 19a and 19b provide plan views of diced capacitor ends on the anode side of the capacitors, and FIGS. 20a and 20b provide plan views of diced capacitor ends on the cathode side of the capacitors;

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor with a surface mountable configuration and improved volumetric efficiency. The capacitor includes a capacitor element containing an anode formed from a valve metal composition, a dielectric film overlying the anode, and a solid electrolyte overlying the dielectric film. The solid electrolyte or other outer surface forms a cathode for the capacitor element. The capacitor element is characterized by first and second opposing end surfaces. An anode lead (e.g., an anode wire) is embedded in the anode and extends from the first end surface of the capacitor element.

A leadframe is provided to form respective anode and cathode terminations for the capacitor. An anode termination is electrically connected to the anode lead and configured such that at least a first portion of the anode termination is substantially parallel to the first end surface of the capacitor body. A second anode termination portion may be provided in a perpendicular relationship to the first portion along a bottom (surface mount) location. The cathode termination includes first and second portions, one or both of which may be in direct electrical connection to the cathode. The first cathode termination portion is parallel to the second end surface of the capacitor body, and is substantially perpendicular to the second cathode termination portion. The second cathode termination portion may be provided along the same bottom surface as the second anode termination portion.

Encapsulation material (such as a molded resin package) is formed to create a device package. The encapsulation is formed to substantially surround the capacitor body and then diced to leave one or more selected portions of the anode and cathode terminations exposed. In one embodiment, the first anode termination portion and first cathode termination portion are exposed on opposing end surfaces of the device package. The second anode and cathode termination portions may also be exposed on the bottom (mounting) surface of the device, either by dicing or by manner in which the encapsulation material is provided. External terminations may then be applied over the exposed anode and cathode terminations and may extend from the opposing end surfaces onto at least one given surface that is adjacent to both opposing end surfaces. Such a configuration provides for termination features that allow for surface mounting and circuit attachment at a single device surface.

The present invention is equally concerned with methods for forming solid electrolytic capacitors, which may be formed using any of a variety of techniques. Exemplary steps in accordance with one embodiment of the present invention are illustrated in the flow chart of FIG. 1. Such steps will be discussed in order, beginning with a first step 10 of providing a capacitor element. As will be discussed in more detail below, such a capacitor element may correspond to a solid electrolytic capacitor body characterized by first and second opposing end surfaces and an anode wire extending from the first end surface.

A variety of particular techniques may be employed to form and thus provide a solid electrolytic capacitor. For example, such capacitors typically contain an anode formed from a valve metal composition. The valve metal composition may have a high specific charge. In some embodiments, a specific charge may be provided from within a range of about 10,000 microFarads*Volts per gram ("μF*V/g") to about 150,000 μF*V/g, or even more than 150,000 μF*V/g in other embodiments. The valve metal composition contains a valve metal (i.e., metal that is capable of oxidation) or valve metalbased compound, such as tantalum, niobium, aluminum, hafnium, titanium, alloys thereof, oxides thereof, nitrides thereof, and so forth. For example, the anode may be formed from a valve metal oxide having an atomic ratio of metal to oxygen of 1:less than 2.5, in some embodiments 1:less than 2.0, in some embodiments 1:less than 1.5, and in some embodiments, 1:1. Examples of such valve metal oxides may include niobium oxide (e.g., NbO), tantalum oxide, etc., and are described in more detail in U.S. Pat. No. 6,322,912 to Fife, which is incorporated herein in its entirety by reference thereto for all purposes.

Conventional fabricating procedures may generally be utilized to form the anode. In one embodiment, a tantalum or niobium oxide powder having a certain particle size is first selected. The particle size may vary depending on the desired voltage of the resulting capacitor. For example, powders with a relatively large particle size (e.g., about 10 micrometers) are often used to produce high voltage capacitors, while powders with a relatively small particle size (e.g., about 0.5 micrometers) are often used to produce low voltage capacitors. The particles are then optionally mixed with a binder and/or lubricant to ensure that the particles adequately adhere to each other when pressed to form the anode. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water; acetone; methyl isobutyl ketone; trichloromethane; fluorinated hydrocarbons (freon) (DuPont); alcohols; and chlorinated hydrocarbons (carbon tetrachloride). When utilized, the percentage of binders and/or lubricants may vary from about 0.1% to about 8% by weight of the total mass. It should be understood, however, that binders and lubricants are not required in the present invention. Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead such as a wire made out of tantalum or other suitable material. It should be further appreciated that the anode wire may alternatively be attached (e.g., welded) to the anode subsequent to pressing and/or sintering of the anode.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

The shape of the anode may also be selected to improve the electrical properties of the resulting capacitor assembly. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

The anode may be anodized so that a dielectric film is formed over and within the porous anode. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. The anode may be dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric quality is formed over the surface of the tantalum pellet. The anodization voltage typically ranges from about 5 to about 200 volts, and in some embodiments, from about 20 to about 100 volts. In addition to being formed on the surface of the anode, a portion of the dielectric oxide film will also typically form on the surfaces of the pores. It should be understood that the dielectric film may be formed from other types of materials and using different techniques.

Once the dielectric film is formed, a protective coating may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1\times10^5$ ohm-cm, and in some embodiments, greater than about $1\times10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming solid electrolytes, which acts as the true cathode of the capacitor. The electrolyte may be formed by pyrolytic decomposition of manganous nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the solid electrolyte. The conductive polymer coating may contain one or more conductive polymers, such as polypyrroles; polythiophenes, such as poly (3,4-ethylenedioxy thiophene) (PEDT); polyanilines; polyacetylenes; poly-p-phenylenes; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy thiophene), may initially be mixed with a polymerization catalyst to form a solution. For example, one suitable polymerization catalyst is Clevios C, which is iron III toluenesulphonate and n-butanol and sold by H. C. Starck. Clevios C is a commercially available catalyst for Clevios M, which is 3,4-ethylene dioxythiophene, a PEDT monomer also sold by H. C. Starck. In most embodiments, once applied, the conductive polymer is healed. Healing may occur after each application of a conductive polymer layer or may occur after the application of the entire conductive polymer coating. Although various methods have been described above, it should be understood that any other method for applying the electrolyte may also be utilized in the present invention.

Once the solid electrolyte is formed, the part may then be applied with a carbon coating (e.g., graphite) and silver coating, respectively. The silver coating may, for instance, act as a solderable conductor, contact layer, and/or charge collector for the capacitor element and the carbon coating may limit contact of the silver coating with the solid electrolyte.

Figure 1:
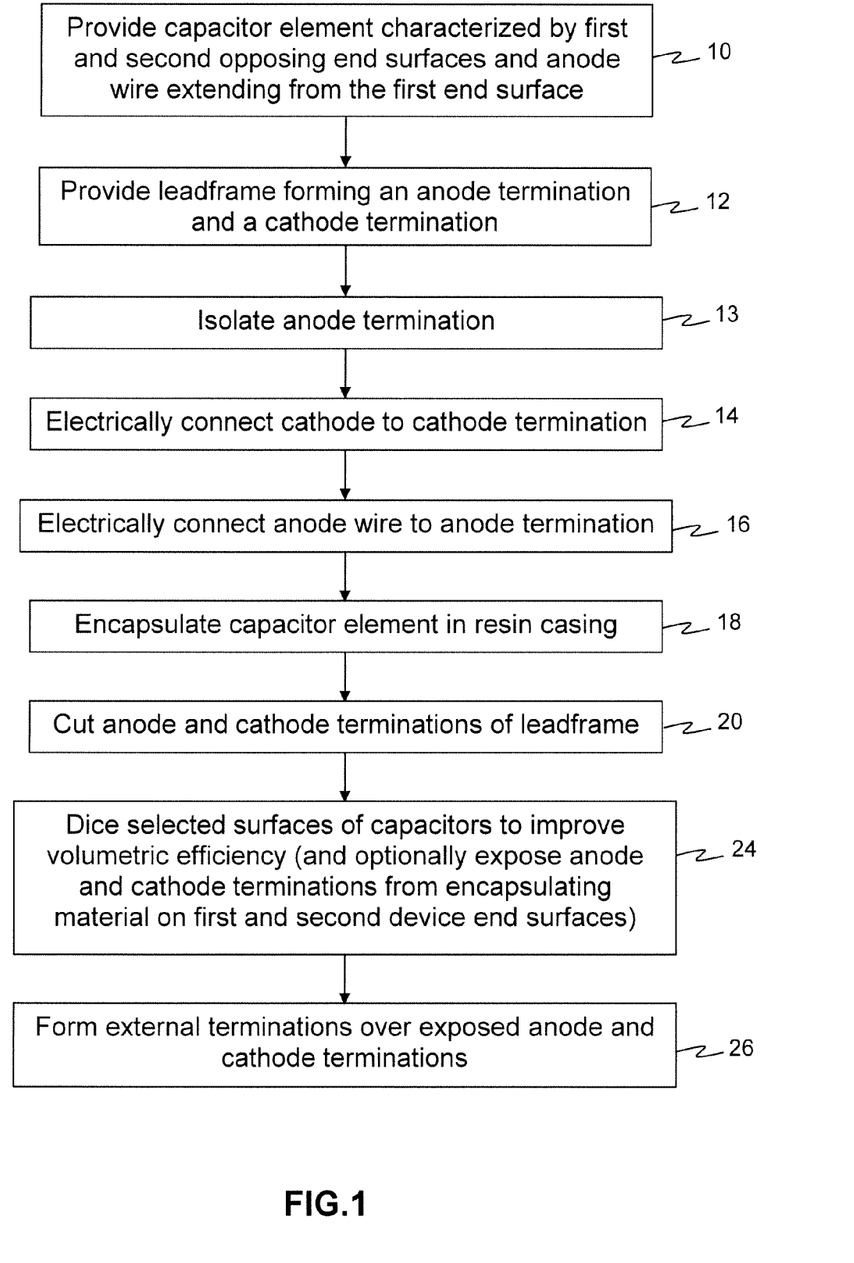
FIG. 1 is a flow chart of exemplary steps that may be employed in a method of forming electrolytic capacitors of the present invention.
Figure 2:
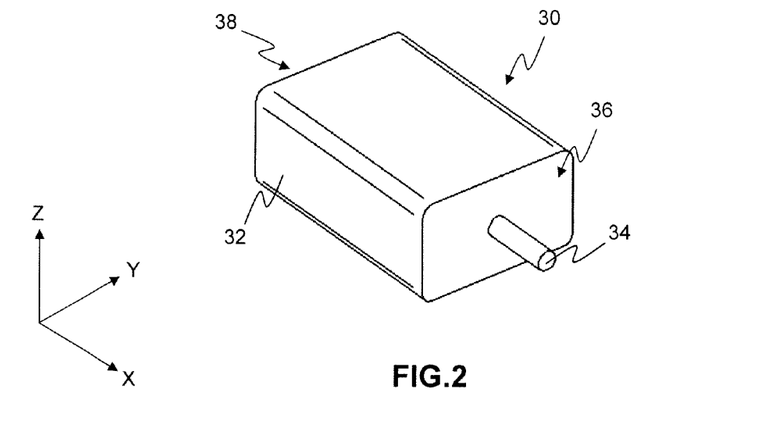
FIG. 2 is a perspective view of an exemplary electrolytic capacitor element with anode and cathode portions that may be employed in the present invention.

Formation and provision of a capacitor element as called for in step 10 of FIG. 1 yields a resultant structure such as that illustrated in FIG. 2. Referring now to FIG. 2, a capacitor element 30 includes a cathode 32 and anode wire 34. Capacitor element 30 is characterized by first and second opposing end surfaces 36 and 38. Anode wire 34 extends from first surface 36 of the capacitor element 30. As described above, an outer coating of the capacitor element 30 serves as the cathode 32 of the capacitor, forming a first electrical connection to the capacitor element and anode wire 34 provides a second electrical connection for the capacitor element 30. It should be appreciated that capacitor element 30 is formed such that the cathode and anode wire are not in direct electrical contact with one another. This may be facilitated by the dielectric coating applied to form the capacitor body or by an insulative cap or other portion placed around the base of the anode wire 34 (not illustrated).

Figure 3:
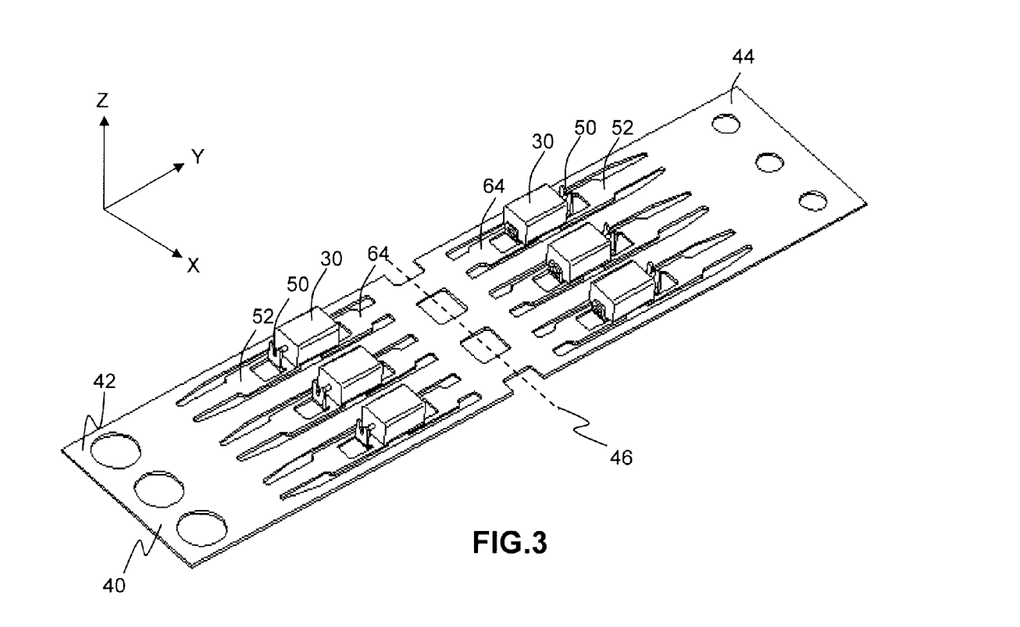
FIGS. 3-6 are respective views of an exemplary leadframe with multiple capacitor elements (such as those illustrated in FIG. 2) positioned thereon, wherein the leadframe provides respective anode and cathode terminations for each capacitor element, and wherein FIG. 3 provides a perspective view relative to –X, –Y and –Z axes, FIG. 4 provides a top plan view in the X-Y plane, FIG. 5 provides a side plan view in the Z-Y plane and FIG. 6 provides an end plan view in the Z-X plane.
Figure 4:
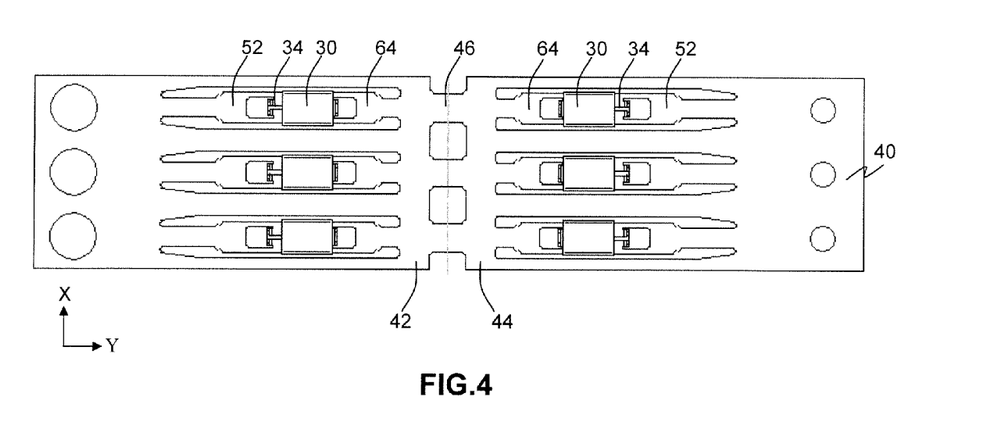
Figure 5:
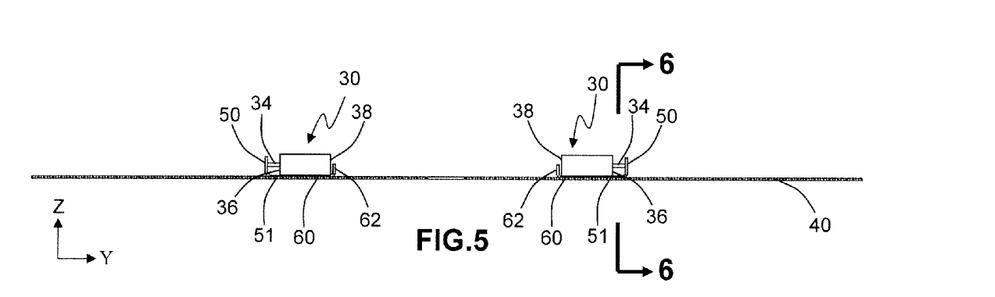
Figure 6:
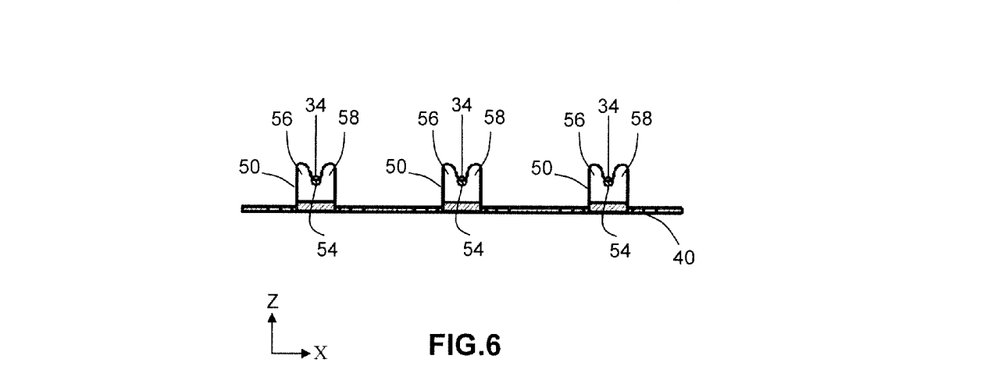
Figure 7:
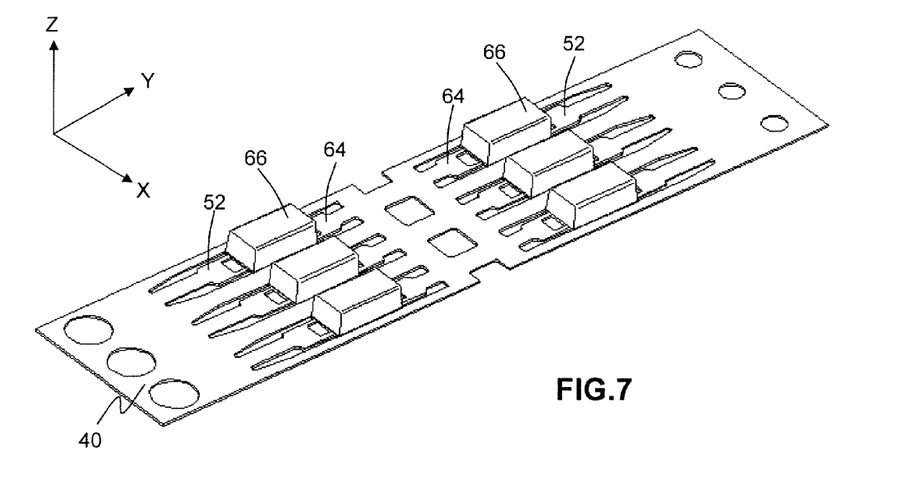
FIGS. 7-10 are respective views of an exemplary leadframe with capacitor elements after provision of an encapsulation material over the respective capacitor elements, wherein FIG. 7 provides a perspective view relative to –X, –Y and –Z axes, FIG. 8 provides a top plan view in the X-Y plane, FIG. 9 provides a side plan view in the Z-Y plane, and FIG. 10 provides an end plan view in the Z-X plane.
Figure 8:
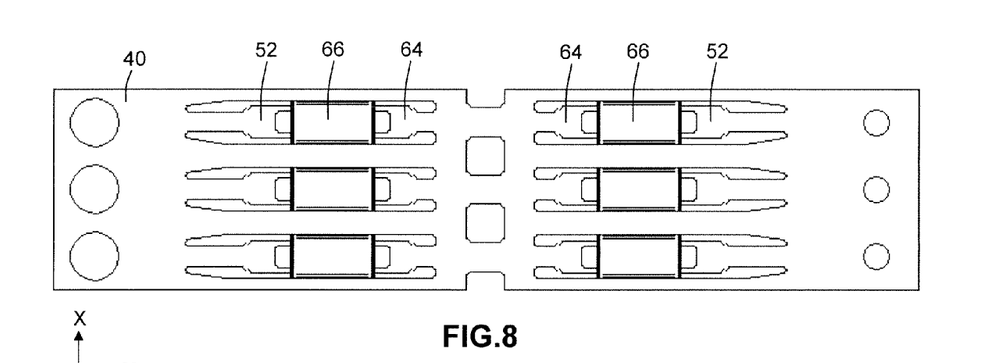
Figure 9:
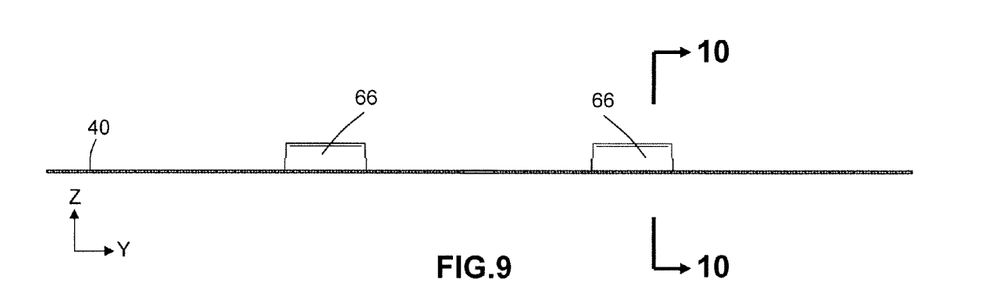

Referring again to FIG. 1, a second exemplary step 12 in accordance with a method of the present invention corresponds to providing a leadframe. An exemplary leadframe 40 with respective capacitor elements 30 positioned therein is illustrated in FIGS. 3-6. FIG. 3 provides a three-dimensional view relative to the –x, –y and –z axes. FIGS. 4-6 provide corresponding two-dimensional views of the same leadframe 40 with capacitor elements 30. FIG. 4 is shown relative to a cross-section in the X-Y plane. FIG. 5 shows a cross-section relative to the Z-Y plane. FIG. 6 provides a cross-section in the Z-X plane. Leadframe 40 may be formed of any conductive material such as a conductive metal (e.g., copper, nickel, silver, zinc, tin, palladium, lead, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). One exemplary conductive material is a copper-iron alloy metal plate available from Wieland (Germany).

As is known in the art, leadframe 40 may contain a plurality of rows and columns, each of which define a receiving location for a respective capacitor element. Such a leadframe configuration facilitates the manufacture of capacitors in bulk, although it should be appreciated that leadframes containing only a single receiving location for one capacitor element may also be utilized. Although many of the figures herein illustrate leadframes for forming a plurality of resultant capacitive devices, it should be appreciated that the present invention should not be unnecessarily limited to bulk manufacturing steps and methods.

The leadframe 40 of FIGS. 3-6 is illustrated with capacitive elements 30 as they would be configured in each of a respective plurality of receiving locations. Six receiving locations and corresponding capacitor elements are illustrated, although the leadframe could be provided to accommodate many more capacitive elements. For example, leadframe 40 may extend in the –x direction to provide for additional capacitor elements. As best illustrated in FIG. 4, leadframe 40 may generally consist of first and second portions 42 and 44, each accommodating a respective row of capacitor elements. Leadframe portions 42 and 44 may be substantially symmetrical around dividing line 46 such that the a capacitor element provided in a receiving location of leadframe portion 42 is oriented in the opposite direction of a capacitor element provided in a corresponding opposing receiving location in leadframe portion 44.

With more particular reference to the receiving location for a given capacitor element 30 within leadframe 40, such receiving location may be formed to define respective anode and cathode terminations. The portion of leadframe 40 forming an anode termination generally consists of two portions—first anode termination portion 50 and second anode termination portion 52. First anode termination portion 50 and second anode termination portion 52 are generally perpendicular to one another, and first anode termination portion 50 is configured to be generally parallel to first end surface 36 of a capacitor element 30 positioned therein. As best seen in FIG. 6, first anode termination portion 50 is formed with a groove 54 recessed between two extended tabs 56 and 58. Groove 54 is adapted for receiving the anode wire 34 of a capacitor element 30.

Referring still to FIGS. 3-6, the portion of leadframe 40 forming a cathode termination generally consists of three portions—first cathode termination portion 60, second cathode termination portion 62 and third cathode termination portion 64. First cathode termination portion 60 is generally perpendicular to second cathode termination portion 62. First cathode termination portion 60 may be parallel with and electrically connected to a bottom surface of the capacitor element 30 (corresponding to a portion of cathode 32). Second termination portion 62 may be parallel with and electrically connected to second end surface 38 of capacitor element 30. It should be appreciated that in some examples, only one of the first and second cathode termination portions 60 and 62 is in direct contact with the cathode 32 of capacitor element 30, although both may be connected for ease of assembly and additional stability. Third cathode termination portion 64 is generally perpendicular with second cathode termination portion 62 and extends away from second end surface 38 of capacitor element 30. In some embodiments, second anode termination portion 52 and third cathode termination portion 64 are provided in substantially the same plane.

Referring again to FIG. 1, step 13 then involves isolating the anode termination. Isolation features may be provided to insulate all or part of second anode termination portion 52 from the cathode 32 of capacitor element 30, thus reducing the risk of an electrical short between the cathode and the anode termination. Isolating step 13 may involve providing insulation material 51 on selected top portions of each second anode termination portion 52 before capacitor elements 30 are positioned within respective receiving locations of leadframe 40. Exemplary depictions of insulation material 51 are variously provided in FIGS. 5, 14a and 14b. Insulation material 51 may be formed of insulation tape or of an insulation or non-conductive material applied to the desired leadframe locations by any suitable technique known in the art, such as vapor deposition, dispensing, or screen masking.

Referring again to FIG. 1, a fourth step 14 in a method of forming an electrolytic capacitor in accordance with the present invention involves electrically connecting at least a portion of cathode 32 to the cathode termination, namely to first and/or second cathode termination portions 60 and 62. To attach a capacitor element 30 to a receiving location within leadframe 40, a conductive adhesive may initially be applied to one or more surfaces of the cathode 32. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes. Any of a variety of techniques may be used to apply the conductive adhesive to the cathode 32. Thereafter, the capacitor element 30 is positioned on leadframe 40 such that the adhesive bonds a bottom surface of the capacitor element 30 to first cathode termination portion 60. Optionally, additional adhesive may bond end surface 38 of capacitor element 30 to second cathode termination portion 62.

Referring still to FIG. 1, step 16 then involves electrically connecting the anode wire 34 to the anode termination, namely to first anode termination portion 50. This may be accomplished using any technique known in the art, such as mechanical welding, laser welding, conductive adhesives, etc. For example, the anode wire 34 may be welded into the groove 54 formed within first anode termination portion 50 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode wire 34 to the first anode termination portion 50, the conductive adhesive used to electrically connect the cathode to the cathode termination may be cured. For example, a heat press may be used to apply heat and pressure to ensure that the capacitor element 30 is adequately adhered to the cathode termination by the adhesive.

Once the capacitors are attached to the leadframe per steps 14 and 16, each capacitor element 30 and respective portions of leadframe 40 is encapsulated in step 18 by respectively enclosing each such element within a resin casing, which may then be filled with silica or any other known encapsulating material. Suitable casings may include, for instance, "F", "G", "H", "J", "K", "L", "N", "P", "R", "S", "T", "W", "Y", or "X" cases (AVX Corporation). One particular embodiment of such an encapsulating case is shown in FIGS. 7-10 as element 66. The encapsulating case 66 provides additional structural and thermal protection for the resultant capacitor.

Figure 10:
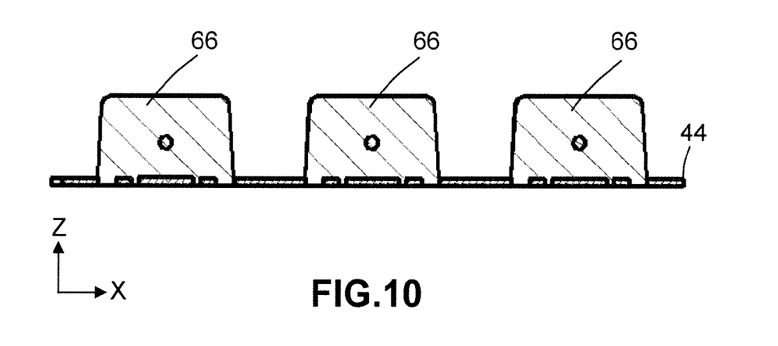

In one example, each encapsulating case 66 substantially covers an entire capacitor element 30 as well as at least part of leadframe 44. In some embodiments, as shown in FIG. 10, the encapsulating case surrounds second anode termination portion 50 and second cathode termination portion 60, while leaving at least a bottom surface of first anode termination portion 52 as well as first cathode termination portion 60 and third cathode termination portion 64 exposed along a bottom (mounting) surface of the encapsulated device.

Figure 11:
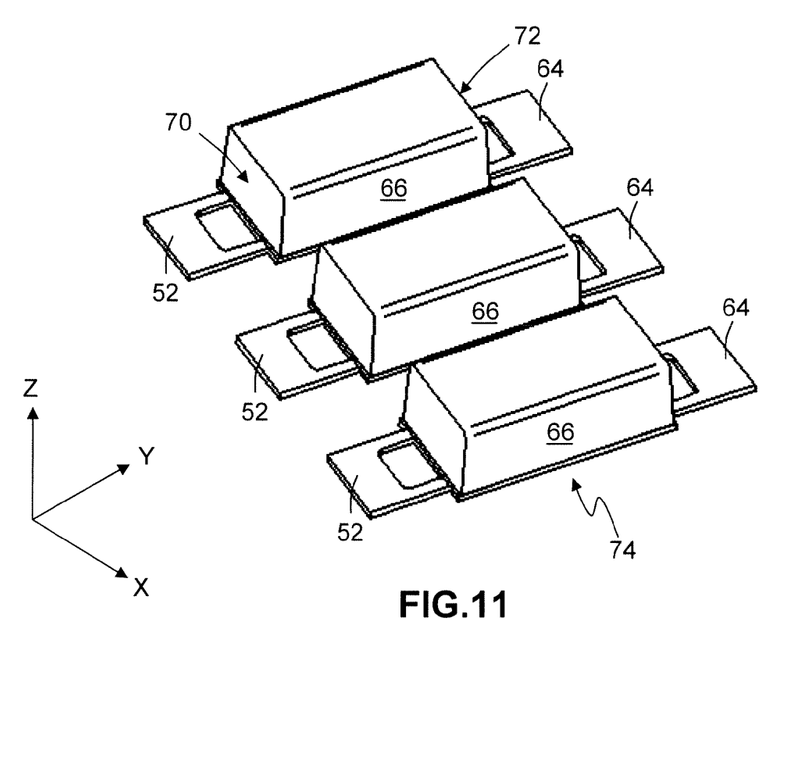
FIG. 11 is a perspective view of three exemplary resultant capacitor structures formed upon cutting the leadframe depicted in FIGS. 7-10.

Step 20 of FIG. 1 refers to the trimming, or cutting step, by which the leadframe is divided into a plurality of respective capacitors. Three exemplary resultant capacitive structures after cutting step 20 are illustrated in FIG. 11, each corresponding to encapsulating case 66, an anode lead corresponding to second anode termination portion 52 and cathode lead corresponding to third cathode termination portion 64. Each encapsulating case may be characterized by first and second opposing end surfaces 70 and 72 and an upper surface 74.

Figures 12A, 12B:
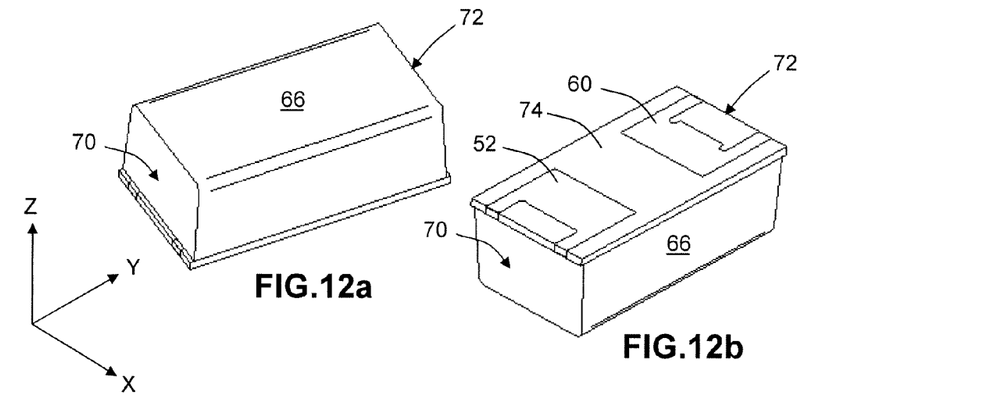
Figures 13A, 13B:
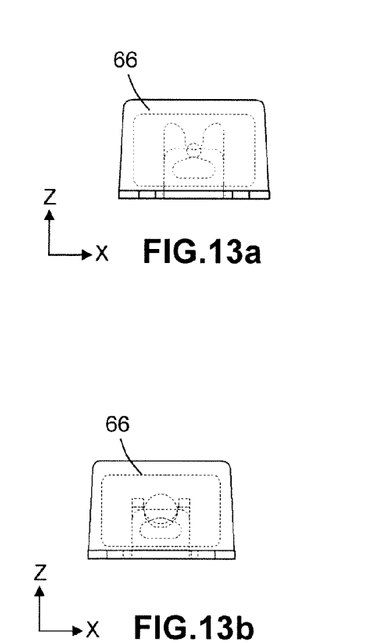
Figure 14:
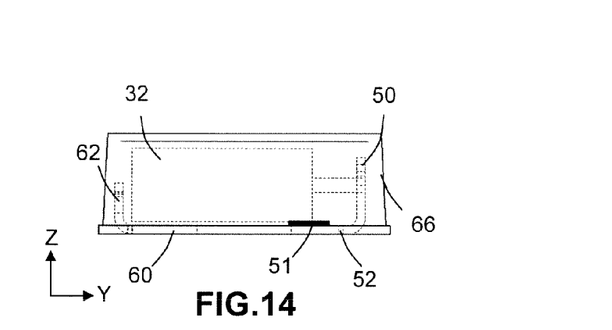
Figure 15:
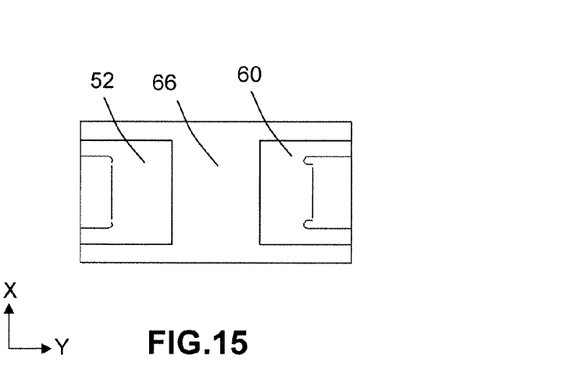
Figure 16A:
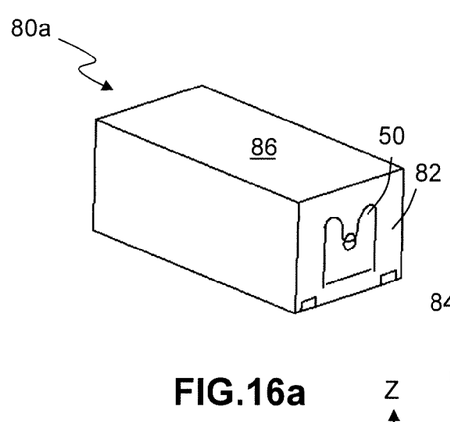
Figure 16B:
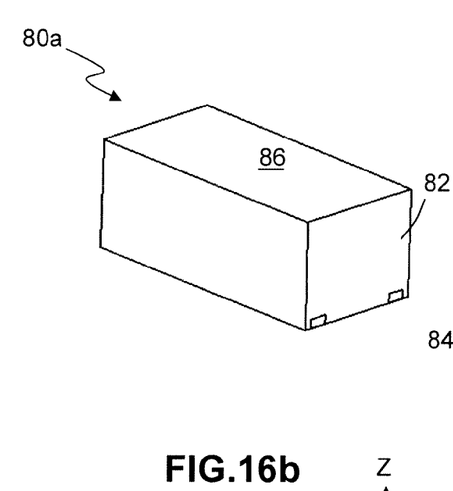
Figure 17A:
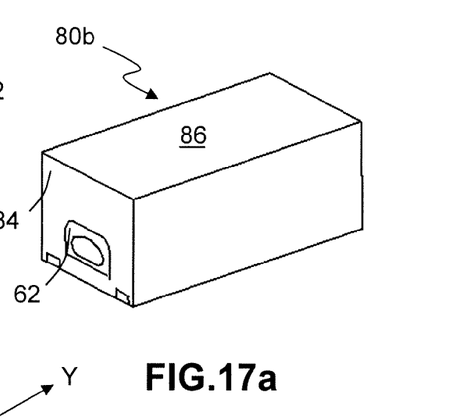
Figure 17B:
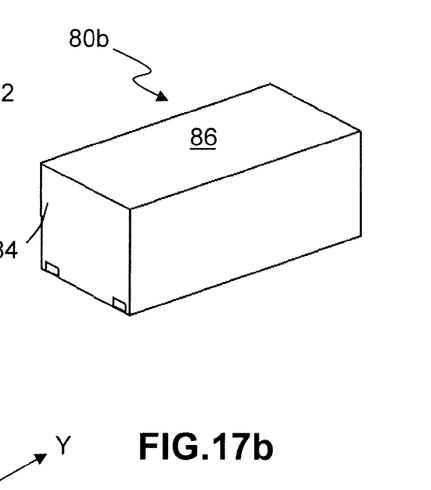
Figure 18A:
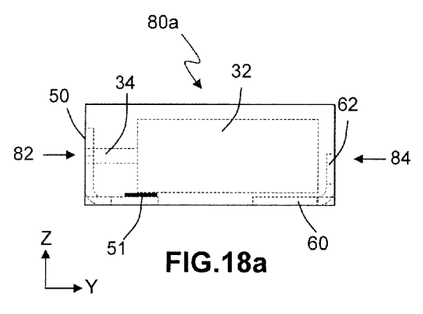
Figure 18B:
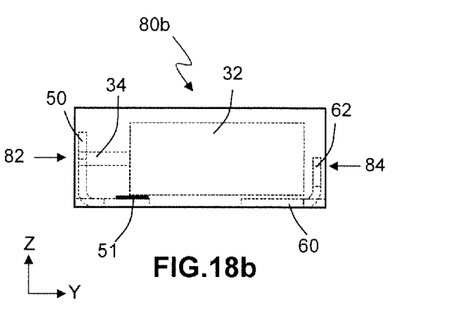
Figure 19A:
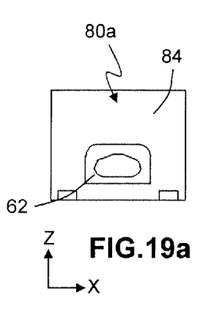
Figure 19B:
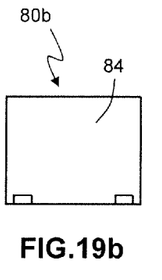
Figure 20A:
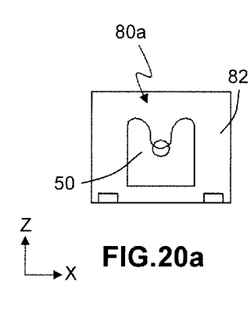
Figure 20B:
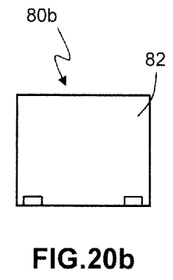

As part of step 20, exposed portions of the respective second anode termination portion 52 and third cathode termination portion 64 may also be aged, screened, and trimmed to remove excess portions thereof. Exemplary views of a capacitor structure after execution of cutting and trimming in step 20 are shown in FIGS. 12a-15. FIG. 12a provides a top perspective view and FIG. 12b provides a bottom perspective view of a capacitor element, showing how the parts of second anode termination portion 52 extending beyond side surface 70 of case 66 and cathode termination portion 64 extending beyond side surface 72 of case 66 may be trimmed. FIGS. 13a and 13b illustrate similar aspects of such exemplary capacitor configuration, shown as respective end views in the Z-X plane. FIG. 13a shows an end plan view of surface 70 (relative to the anode side of the capacitor) while FIG. 13b shows an end plan view of surface 72 (from the cathode side of the capacitor). FIG. 14 shows a side plan view of the trimmed capacitor element, and FIG. 15 shows a bottom (surface mount) plan view of the trimmed capacitor element.

Although the capacitor illustrated in FIGS. 12a-15 is adequate for providing a surface-mountable electrolytic capacitor, additional steps may be taken in accordance with the present invention whereby further improvements in volumetric efficiency can be achieved by dicing each encapsulated capacitor element at one or more locations per step 24 of FIG. 1.

For example, FIGS. 16a, 17a, 18a, 19a and 20a respectively show various views of a first exemplary resultant capacitor 80a that has been diced to expose anode and cathode termination portions on first and second device end surfaces. FIGS. 16b, 17b, 18b, 19b and 20b respectively show various views of a second exemplary resultant capacitor 80b that has also been diced. To achieve capacitors 80a and 80b, dicing may occur at six separate locations (one for each surface of the encapsulating case 66 shown in FIGS. 12-15). Alternatively, a similar structure may be achieved by only dicing at four side locations. Other numbers of dicing cuts may be practiced in accordance with embodiments of the subject apparatuses and methods.

Exemplary techniques used to perform the dicing involved in step 26 include without limitation cutting and machining, for example, by high accuracy, microprocessor-controlled dicing saws or high cut rate diamond cutting wheels. However, additional techniques may include laser cutting, water cutting, etching, grinding or other known methods to form the body shape depicted in FIGS. 16-20. The cutting is preferably carried out though a plane or planes perpendicular or substantially perpendicular to one or more surfaces of the internal capacitor element.

In further accordance with FIGS. 16a-20a, resultant capacitor 80a is generally shaped as a rectangular prism characterized by first and second opposing end surfaces 82 and 84 and a top surface 86 that is adjacent to both first and second end surfaces 82 and 84. At least one of the capacitor cuts from step 24 exposes first anode termination portion 50 along first end surface 82 of capacitor 80. Similarly, second cathode termination portion 62 is exposed from the capacitor encapsulation material along second end surface 84. The resultant size of capacitor 80a after dicing steps are performed may correspond to one of EIA standard case sizes (such as referred to by AVX as the alpha-based references listed above). So, for example, a device that was encapsulated as shown in FIGS. 7-10 with an "A" case size may be diced to form a structure with an "R" case size. Similarly, a device encapsulated as shown in FIGS. 7-10 with an "R" case size may be diced to form a structure with a "J" case size. Similar transformations between other case sizes may occur, and resultant capacitor dimensions are not limited to those corresponding to a conventional case size offered by AVX or other company.

In further accordance with FIGS. 16b-20b, resultant capacitor 80b is substantially similar to capacitor 80a described above, except that the first anode termination portion 50 and second cathode termination portion 62 are not exposed by dicing step 24. Instead, as appreciated from FIG. 18b, at least one of the capacitor cuts is formed substantially parallel to first anode termination portion 50 in a manner that doesn't expose first anode termination portion 50 but is substantially close in order to maximize volumetric efficiency of the resultant device. Similarly, at least one of the capacitor cuts is formed substantially parallel to second cathode termination portion 62 in a manner that doesn't expose portion 62 but that improves volumetric efficiency.

A still further step in accordance with the exemplary method of FIG. 1 corresponds to a step 26 of forming external terminations for the resultant capacitor structures 80a and 80b illustrated in FIGS. 16a-20b. Although such external terminations may not be required in some embodiments, external terminations may be formed when desired to provide more reliable electrical connection to the respective anode and cathode terminations of a device. Also, external terminations may be formed in a symmetrical fashion to yield a more versatile device. Still further, multiple terminations may be formed that wrap-around to a single given surface of the capacitor to facilitate surface mounting of the capacitor.

Figure 21:
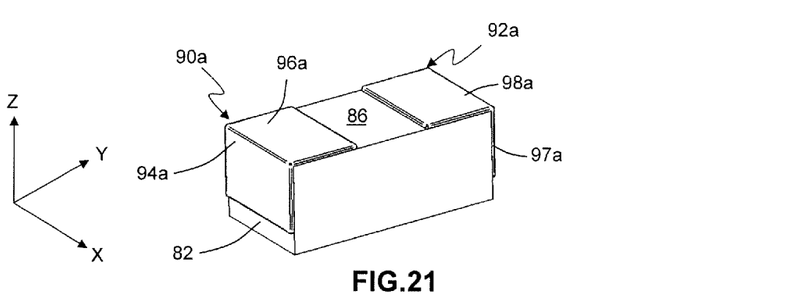
FIGS. 21-23 are respective views of a diced capacitor with first exemplary external terminations in accordance with the present invention, wherein FIG. 21 provides a perspective view relative to –X, –Y and –Z axes, FIG. 22 provides a side plan view in the Z-Y plane and FIG. 23 provides an end plan view in the Z-X plane.
Figure 22:
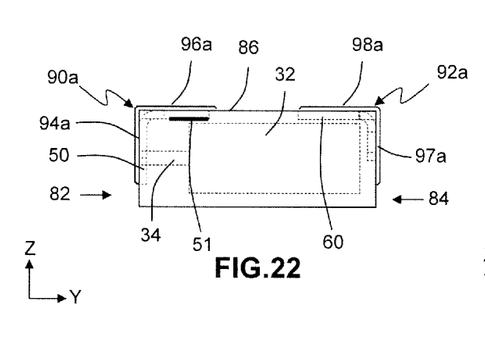
Figure 23:
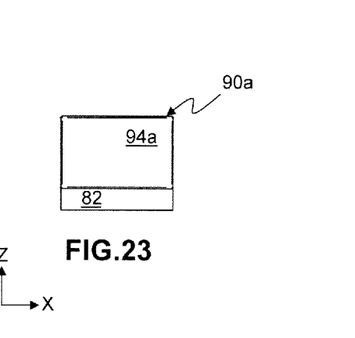

Referring now to FIGS. 21-23, a capacitor with first exemplary external terminations 90a and 92a is illustrated. First external termination 90a is formed with a first portion 94a that covers at least a substantial portion of first end surface 82 (including the exposed portion of first anode termination portion 50 if exposed by one of the dicing cuts). An optional second portion 96a of first external termination 90a is formed in a substantially perpendicular fashion to portion 94a and wraps around to top surface 86 of the capacitor to substantially cover the exposed second anode termination portion 52. Second external termination 92a is formed with a first portion 97a that may generally cover at least a substantial portion of second end surface 84 (including the exposed portion of second cathode termination portion 62 if exposed by one of the dicing cuts), and an optional second portion 98a that wraps around to top surface 86 of the capacitor and substantially covers the exposed cathode termination portion 60.

Figure 24:
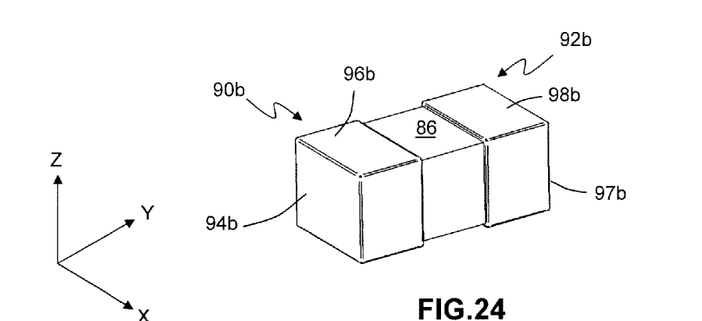
FIGS. 24-26 are respective views of a diced capacitor with second exemplary external terminations in accordance with the present invention, wherein FIG. 24 provides a perspective view relative to –X, –Y and –Z axes, FIG. 25 provides a side plan view in the Z-Y plane and FIG. 26 provides an end plan view in the Z-X plane.
Figure 25:
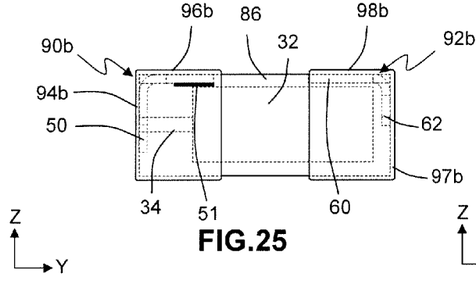
Figure 26:
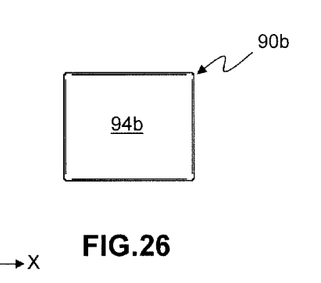

Referring now to FIGS. 24-26, a capacitor with second exemplary external terminations 90b and 92b is illustrated, with similar reference views as FIGS. 21-23. First exemplary external termination 90b is formed with a first portion 94b that substantially covers the entire first end surface 82 of the capacitor. Wrap-around termination portion 96b extends from the first portion 94b onto at least some of each of the four device surfaces adjacent to first end surface 82. Second exemplary termination 92b is formed with a first portion 97b that substantially covers the entire second end surface 84 of the capacitor. Wrap-around termination portion 98b extends from portion 97b onto at least some of each of the four device surfaces adjacent to second end surface 82. In some embodiments, wrap-around termination portions 96b and 98b extend far enough along their respective applied device surfaces to substantially cover exposed anode termination portion 52 and cathode termination portion 60 as well as provide surface-mounting lands for the capacitor.

External terminations may include one or more layers formed of any conductive material, such as but not limited to conductive metal (e.g., copper, nickel, silver, zinc, tin, palladium, lead, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). In one example, external terminations 90a/90b and 92a/92b respectively include a first layer of nickel to promote leach resistance, a second layer of silver and a third layer of tin or other solder alloy to protect the under-layers from oxidation and to promote easily soldered terminations in an integrated circuit (IC) environment.

External terminations may be formed in a variety of fashions, such as by printing, vapor deposition, screen masking, sputtering, electroplating, electroless or immersion plating and the like. One method corresponds to electroplating or electrochemical deposition, wherein an electronic component with exposed conductive portions is exposed to a plating solution such as electrolytic nickel or electrolytic tin characterized by an electrical bias. The component itself is then biased to a polarity opposite that of the plating solution, and conductive elements in the plating solution are attracted to the exposed metallization of the component. Electroless plating involves full immersion of electronic components in a plating solution with no polar biasing. Still further techniques that may be utilized to form external terminations 90a/90b, 92a/92b involve magnetic attraction of plating material, electrophoretics or electrostatics.

As a result of the present invention, a capacitor assembly may be formed that exhibits excellent electrical properties. For instance, the capacitor may exhibit a high capacitance and a low equivalent series resistance (ESR), which refers to the extent that the capacitor has resistance in series with capacitance, which delays charging and discharging and causes losses in electronic circuit. The present invention may be better understood by reference to the following examples.

Test Procedures

Equivalent Series Resistance (ESR), Capacitance, and Dissipation Factor:

Equivalent series resistance was measured using a Hewlett Packard 4192A LCZ meter with 0 volts bias and 1 volt signal. The operating frequency was 100 kHz. The capacitance and dissipation factor were measured using a Hewlett Packard 4192A LCZ meter with 2 volts bias and 1 volt signal. The operating frequency was 120 Hz and the temperature was 23° C.±2° C.

Leakage Current:

Leakage current ("DCL") was measured using a Keithley 2400 source meter. The Keithley 2400 measures leakage current at a temperature of 23° C.±2° C. and at a 1,1 rated voltage after 12 seconds.

Example 1

A capacitor was constructed in accordance with the present invention as described above. Specifically, a capacitor was formed by first providing a capacitor element having a capacitor body measuring about 0.74 mm in height, 1.28 mm in width and 1.71 mm in length, thus having a resultant volumetric size of about 1.62 mm$^3$. After attaching the anode wire and cathode of such a capacitor element to a leadframe, it was encapsulated with a low profile "S" case size (EIA "A" case footprint with max height 1.2 mm) corresponding to a height of about 1.18 mm, a width of about 1.68 mm and a length of about 3.4 mm, thus yielding an overall volumetric size of about 6.74 mm$^3$. The component was then diced on five sides to yield a device that is substantially equivalent to one having an "R" case size, corresponding to a height of about 1.18 mm, a width of about 1.47 mm and a length of about 2.21 mm, and a resultant volumetric size of about 3.83 mm$^3$. The volumetric efficiency of the device assembly provides a comparison of the size of the capacitor element to the overall capacitor size, which for the resultant diced assembly corresponds to about 1.49/3.83=39%.

In order to provide a relative comparison of the above volumetric efficiency, the volumetric efficiency of a standard tantalum capacitor using prior art construction techniques to create a capacitor with the same overall case size is calculated. In accordance with such standard techniques, the maximum capacitor portion would be characterized by dimensions of about 0.65 mm in height, 1.15 mm in width and 0.98 mm in length, thus having a resultant volumetric size of about 0.73 mm$^3$. In a similar "R" case size, this yields an overall volumetric efficiency of about 0.73/3.83=19%. As such, the capacitor of Example 1 constructed in accordance with aspects of the present invention achieves approximately a 20% increase in volumetric efficiency compared to standard electrolytic capacitors.

Various electrical properties of one sample were tested. The results are set forth below in Table 1.

TABLE 1

Electrical Properties (Average of Measured Values)

| Parameter | Value |
|---|---|
| Capacitance (μF) | 96.12 |
| Dissipation Factor (%) | 14.02 |

TABLE 1-continued

Electrical Properties (Average of Measured Values)

| Parameter | Value |
|---|---|
| IMP (Ω) | 0.85 |
| ESR (Ω) | 0.82 |
| DCL (μA) at 4.4 Volts | 3.34 |

As indicated, the capacitor assembly of the present invention exhibited excellent electrical properties.

Example 2

A capacitor was constructed in accordance with the present invention as described above. Specifically, a capacitor was formed by first providing a capacitor element having a capacitor body measuring about 0.56 mm is height, 0.74 mm in width and 1.27 mm in length, thus having a resultant volumetric size of about 0.53 mm$^3$. After attaching the anode wire and cathode of such a capacitor element to a leadframe, it was encapsulated with a standard "R" case size corresponding to a height of about 1.12 mm, a width of about 1.43 mm and a length of about 2.2, thus yielding an overall volumetric size of about 3.52 mm$^3$. The component was then diced on all six sides to yield a device that is substantially equivalent to one having a "J" case size, corresponding to a height of about 0.84 mm, a width of about 0.87 mm and a length of about 1.67 mm, and a resultant volumetric size of about 1.22 mm$^3$. The volumetric efficiency of the device assembly provides a comparison of the size of the capacitor element to the overall capacitor size, which for the resultant diced assembly corresponds to about 0.53/1.22=43%.

In order to provide a relative comparison of the above volumetric efficiency, the volumetric efficiency of a standard tantalum capacitor using prior art construction techniques to create a capacitor with the same overall case size is calculated. In accordance with such standard techniques, the maximum capacitor portion would be characterized by dimensions of about 0.53 mm in height, 0.69 mm in width and 0.68 mm in length, thus having a resultant volumetric size of about 0.25 mm$^3$. When encapsulated in a similar "J" case size, this yields an overall volumetric efficiency of about 0.25/1.22=20%. As such, the capacitor of Example 2 constructed in accordance with aspects of the present invention achieves approximately a 23% increase in volumetric efficiency compared to standard electrolytic capacitors.

Various electrical properties of one sample were tested. The results are set forth below in Table 2.

TABLE 2

Electrical Properties (Average of Measured Values)

| Parameter | Value |
|---|---|
| Capacitance (μF) | 9.16 |
| Dissipation Factor (%) | 8.24 |
| IMP (Ω) | 5.54 |
| ESR (Ω) | 5.44 |
| DCL (μA) at 11 Volts | 0.93 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method of forming a capacitor, the method comprising:
providing a capacitor element, said capacitor element characterized by opposing first and second end surfaces, a cathode, and an anode wire extending from the first end surface;
providing a leadframe forming an anode termination comprising first and second generally perpendicular anode termination portions and a cathode termination comprising first and second generally perpendicular cathode termination portions;
electrically connecting said anode wire to the said first anode termination portion, whereby said first anode termination portion is substantially parallel to said first end surface of said capacitor element;
electrically connecting said cathode to said cathode termination, whereby said first cathode termination portion is substantially parallel to said second end surface of said capacitor element;
encapsulating said capacitor element and at least a portion of said leadframe including said first anode termination portion and said first cathode termination portion, wherein said second anode termination portion and said second cathode termination portion remain exposed from encapsulation on a given mounting surface;
forming one or more diced cuts through the encapsulated capacitor body to remove excess encapsulating material and improve volumetric efficiency of the resultant capacitor.

2. The method of claim 1, wherein said dicing step more particularly comprises: forming a first cut through the encapsulated capacitor element to expose the first anode termination portion on a first end surface of the resultant capacitor; and forming a second cut through the encapsulated capacitor element to expose the first cathode termination portion on a second opposing end surface of the resultant capacitor.

3. The method of claim 1, wherein said dicing step more particularly comprises forming multiple cuts through the encapsulated capacitor body, each cut being substantially parallel to a respective surface of the capacitor element.

4. The method of claim 3, wherein said dicing step comprises forming at least four cuts along different device surfaces.

5. The method of claim 1, wherein said step of providing a capacitor element comprises providing a solid electrolytic capacitor containing an anode formed from a valve metal composition, a dielectric film overlying the anode, and a solid electrolyte overlying the dielectric film.

6. The method of claim 1, wherein said step of electrically connecting said anode wire to said first anode termination portion comprises laser welding.

7. The method of claim 1, wherein said step of electrically connecting said cathode to said cathode termination comprises connecting at least one surface of said capacitor element to said second cathode termination portion with conductive paste.

8. The method of claim 1, further comprising a step of forming a first external termination over the exposed second anode termination portion and a second external termination over the exposed second cathode termination portion.

9. The method of claim 2, further comprising a step of forming a first external termination over the exposed second anode termination portion wrapping around to an adjacent first end surface over the exposed first anode termination portion and a second external termination over the exposed second cathode termination portion wrapping around to an adjacent second end surface over the exposed first cathode termination portion.

10. The method of claim 9, wherein said step of forming first and second external terminations comprises electroplating a conductive material over the exposed anode and cathode termination portions.

11. The method of claim 1, further comprising a step of electrically insulating said second anode termination portion from the cathode of said capacitor element.

* * * * *